(12) United States Patent
Tallam (10) Patent No.: US 7,336,509 B2
(45) Date of Patent: Feb. 26, 2008

(54) METHOD AND APPARATUS FOR ESTIMATING LINE INDUCTANCE FOR PWM RECTIFIER CONTROL

(75) Inventor: Rangarajan M. Tallam, Greenfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 161 days.

(21) Appl. No.: 11/237,152

(22) Filed: Sep. 28, 2005

(65) Prior Publication Data

US 2007/0070660 A1 Mar. 29, 2007

(51) Int. Cl.
*H02M 5/40* (2006.01)
*H02M 5/458* (2006.01)
*H02H 7/125* (2006.01)

(52) U.S. Cl. ............................ 363/37; 363/34; 363/81; 363/84; 363/52; 363/53

(58) Field of Classification Search .................. 363/34, 363/37, 50, 52, 53, 81, 84
See application file for complete search history.

(56) References Cited

U.S. PATENT DOCUMENTS

| | | | | | |
|---|---|---|---|---|---|
| 4,328,454 | A | * | 5/1982 | Okuyama et al. | 318/803 |
| 4,816,985 | A | * | 3/1989 | Tanahashi | 363/81 |
| 5,255,175 | A | * | 10/1993 | Uchino | 363/81 |
| 5,705,905 | A |  | 1/1998 | Wood |  |
| 5,892,674 | A | * | 4/1999 | Shimada et al. | 363/127 |
| 5,905,644 | A |  | 5/1999 | Kaura et al. |  |

OTHER PUBLICATIONS

S. Hiti & D. Boroyevich, "Control of front-end three phase boost rectifier," IEEE APEC Proceedings, vol. 2, pp. 927-933, 1994.
L. Asiminoaei et al., "A new method of on-line grid impedance estimation for PV inverter," IEEE APEC Proceedings, vol. 3, pp. 1527-1533, 2004.
M. Sumner et al., "Experimental evaluation of active filter control incorporating on-line impedance measurement," International Conference on Harmonics and Quality of Power, vol. 2, pp. 501-506, 2002.
A.J. Arriagada et al., "On-line filtering reactance identification in voltage-source three-phase active front-end rectifiers," IEEE IECON Proceedings, vol. 1, pp. 192-197, 2003.
K. Matsui, N. Ishigure and F. Ueda, "On-line impedance meter to measure the impedance of a distribution line using an inverter," IEEE IECON Proceedings, vol. 2, pp. 1230-1236, 2001.

* cited by examiner

*Primary Examiner*—Bao Q. Vu
(74) *Attorney, Agent, or Firm*—Quarles & Brady LLP; Alexander R. Kuszewski (57) ABSTRACT

A rectifier includes a switching circuit and a controller. The switching circuit is coupled between positive and negative buses and a plurality of input voltage sources. The switching circuit includes a plurality of pairs of switching devices. Each pair is associated with one of the input voltage sources. The controller includes first and second control loops operable to generate control signals for operating the pairs of switching devices to generate a potential across the positive and negative buses. The controller is further operable to estimate a line inductance seen by the rectifier based on at least one of the control signals and generate an inductance compensation gain factor for applying to the control loops based on the estimated line inductance.

28 Claims, 5 Drawing Sheets

METHOD AND APPARATUS FOR ESTIMATING LINE INDUCTANCE FOR PWM RECTIFIER CONTROL

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to power conversion and conditioning and, more particularly, to estimating line inductance for controlling a pulse width modulation (PWM) rectifier.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Power plants are linked to power consuming facilities (e.g., buildings, factories, etc.) via utility grids designed so as to be extremely efficient in delivering massive amounts of power. To facilitate efficient distribution, power is delivered over long distances as low frequency three-phase AC current.

Despite being distributable efficiently, low frequency AC current is sometimes not suitable for end use in consuming facilities. Thus, prior to end use power delivered by a utility has to be converted to a useable form. To this end a typical power "conditioning" configuration includes an AC-to-DC rectifier that converts the utility AC power to DC across positive and negative DC buses (i.e., across a DC link) and an inverter linked to the DC link that converts the DC power back to three phase AC power having an end-useable form (e.g., three phase relatively high frequency AC voltage). A controller controls the inverter in a manner calculated to provide voltage waveforms required by the consuming facility.

Motors and their associated loads are one type of common inductive load employed at many consuming facilities. While the present invention is applicable to different load types, to simplify this explanation, an exemplary motor with an associated load will be assumed. To drive a motor an inverter includes a plurality of switches that can be controlled to link and delink the positive and negative DC buses to motor supply lines. The linking-delinking sequence causes voltage pulses on the motor supply lines that together define alternating voltage waveforms. When controlled correctly, the waveforms cooperate to generate a rotating magnetic field inside a motor stator core. The magnetic field induces (hence the nomenclature "induction motor") a field in motor rotor windings. The rotor field is attracted to the rotating stator field and hence the rotor rotates within the stator core.

A pulse width modulation (PWM) rectifier is one type of rectifier employed in a high performance adjustable speed drive (ASD) where regeneration or high quality input current is required. As AC drives proliferate, equipment system specifications limiting the amount of harmonic current injected into the utility grid are becoming more common and thus solicit cost effective harmonic mitigation solutions. System specifications are often written so measured total harmonic distortion at the Point of Common Coupling (PCC) complies with the maximum low voltage total harmonic distortion levels (THDV) and system classification of IEEE 519. The PCC is usually at the power metering point where other customers connect to the common line voltage but may also be within a plant where linear and non-linear loads are connected. Diode rectifiers typically encounter difficulty in attempting to met the harmonic distortion constraints.

Typical PWM rectifiers are better able to meet the harmonic distortion requirements, but are more costly than conventional diode rectifiers. This cost differential has typically precluded the use of PWM rectifiers in medium performance applications. As compared to a diode rectifier, a PWM rectifier requires an additional input LCL filter on the source side, boost inductors on the conversion side, and switching devices used to implement the PWM technique.

The control of a PWM rectifier is affected by variable inductance present in the power lines. Various methods have been used to measure power line impedance. Typically, for PWM rectifier control, it is sufficient to determine the line impedance between the AC input and the rectifier at the fundamental frequency. Estimation of the effective inductance allows adjustment of the current loop gains to obtain the desired dynamic response even under changing line conditions. Estimation of line inductance to adjust control gains is also important to avoid interactions and unstable operation in applications where parallel operation of three-phase rectifiers is required. Previous techniques typically require additional hardware or increased complexity, and sometimes involve injecting test signals or switching in loads, to estimate line impedance.

It would be desirable for a PWM rectifier control circuit to estimate line impedance without requiring additional hardware or complexity.

BRIEF SUMMARY OF THE INVENTION

One aspect of the present invention is seen in a rectifier including a switching circuit and a controller. The switching circuit is coupled between positive and negative buses and a plurality of input voltage sources. The switching circuit includes a plurality of pairs of switching devices. Each pair is associated with one of the input voltage sources. The controller includes first and second control loops operable to generate control signals for operating the pairs of switching devices to generate a potential across the positive and negative buses. The controller is further operable to estimate a line inductance seen by the rectifier based on at least one of the control signals and generate an inductance compensation gain factor for applying to the control loops based on the estimated line inductance.

Another aspect of the present invention is seen in a method for controlling a rectifier. The rectifier includes a switching circuit coupled between positive and negative buses and a plurality of input voltage sources. The switching circuit includes a plurality of pairs of switching devices. Each pair is associated with one of the input voltage sources. The method includes generating control signals for operating the pairs of switching devices to generate a potential across the positive and negative buses. A line inductance seen by the rectifier is estimated based on at least one of the control signals. An inductance compensation gain factor for use in generating the control signals is generated based on the estimated line inductance.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
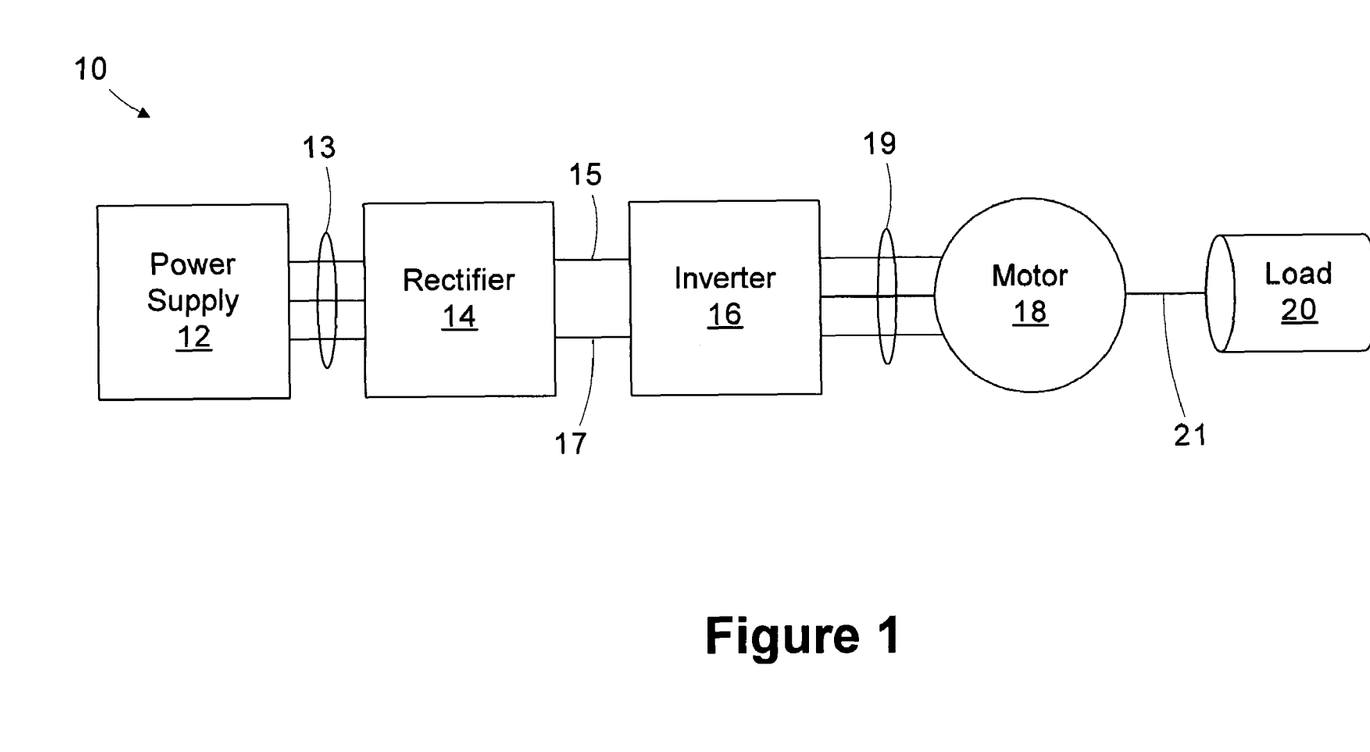
FIG. 1 is a simplified diagram of a motor control system in accordance with one embodiment of the present invention.

Referring now to the drawings wherein like reference numbers correspond to similar components throughout the several views and, specifically, referring to FIG. 1, the present invention shall be described in the context of an exemplary motor control system 10. The motor control system 10 includes a power supply 12, a rectifier 14, an inverter 16, a three-phase motor 18, a load 20, and a plurality of lines and buses that link the aforementioned components together in the manner described hereinafter.

The power supply 12 typically provides a three phase AC voltage received from a utility grid over lines 13. The nominal line voltage of the power supply 12 may vary depending on the particular implementation. The rectifier 14 receives 3-phase power from the power supply 12 and converts the AC power to DC. The inverter 16 is positioned between positive and negative DC buses 15, 17 of the rectifier 14. Although not illustrated, as is well known in the motor controls industry, the inverter 16 includes a plurality of switching devices (e.g., BJT's, etc.) that are positioned between the positive and negative DC buses 15, 17 and supply lines 19 such that by opening and closing specific combinations of the inverter switches, positive and negative DC voltage pulses are generated on each of the supply lines 19. By opening and closing the inverter switches in specific sequences, AC voltages having controllable amplitudes and frequencies can be generated on each of the supply lines 19.

Each of the lines 19 is linked to a separate one of three-phase windings (not separately numbered or illustrated) of the motor 18. By providing known sequences of AC voltages across the motor windings, varying currents are caused therein which induce a rotating magnetic field within a motor stator core. A motor rotor (not illustrated) which is linked to a motor shaft 21 resides within the motor core. The rotor includes either bars or windings or both and, when the changing and rotating magnetic field within the stator core intersects the rotor, currents are induced within the rotor and the rotor currents in turn cause a rotor magnetic field within the stator core. The rotor field is attracted by the rotating stator field and hence the rotor rotates within the stator core. The load 20 is attached via shaft 21 to the rotor and therefore, when the rotor rotates, load 20 also tends to rotate in the same direction.

Although the rectifier 14 of the present invention is described as it may be used to provide DC power for the inverter 16 for controlling the motor 18, the application of the present invention is not limited to a motor application. For example, the rectifier 14 may be connected to some other load, such as a common DC bus load, which in turn is connected to a group of inverters.

Figure 2:
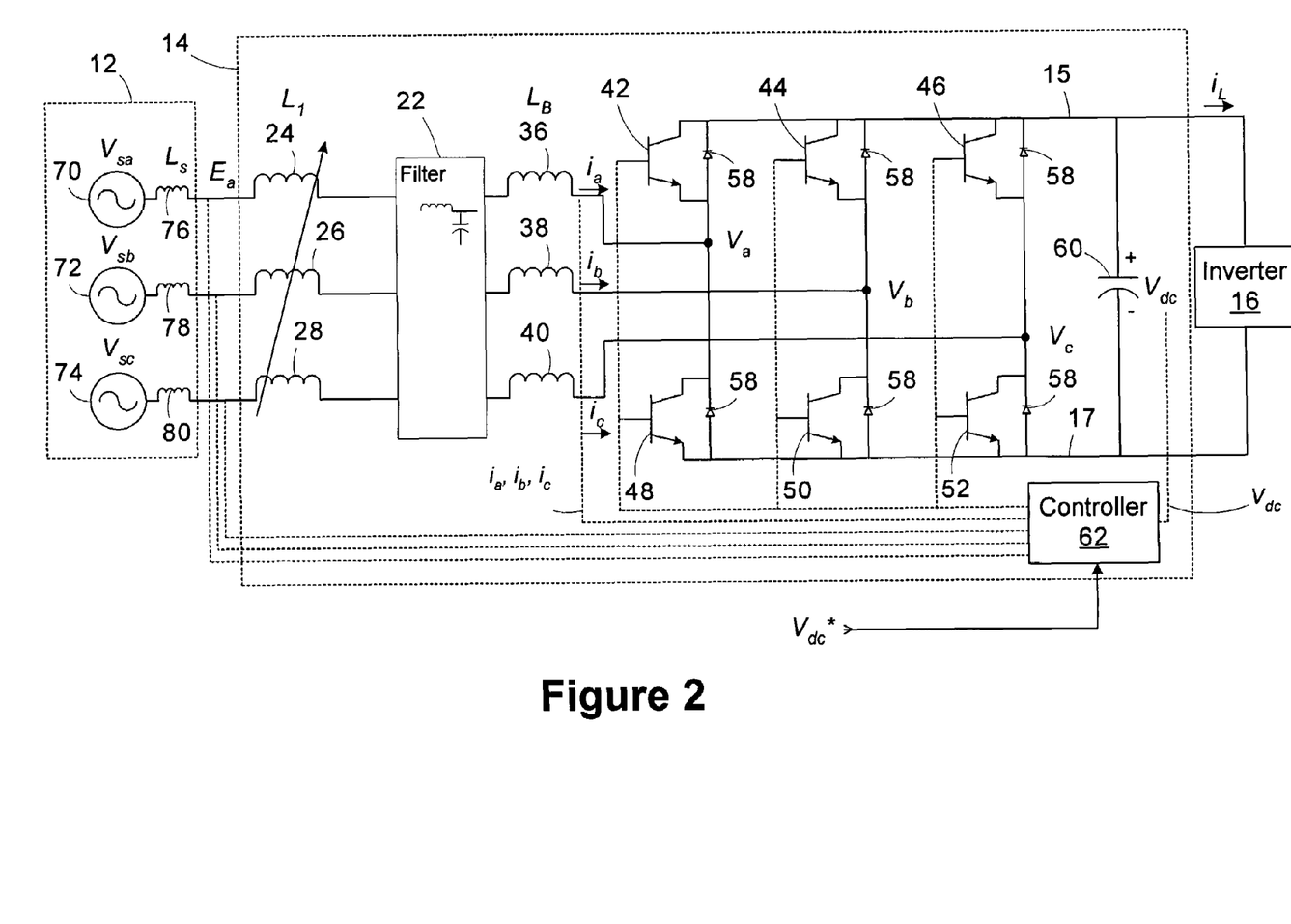
FIG. 2 is a diagram of a rectifier in the motor control system of FIG. 1.

Turning now to FIG. 2, a circuit diagram of the rectifier 14 interfacing with the power supply 12 and the inverter 16 is provided. The rectifier 14 includes an LCL filter 22; boost inductors 36, 38, 40 (represented by $L_B$); upper transistors 42, 44, 46 and lower transistors 48, 50, 52 coupled between the positive and negative buses 15, 17; bypass diodes 58 coupled across the transistors 42, 44, 46, 48, 50, 52; a bus capacitor 60 coupled between the positive and negative buses 15, 17; and a controller 62. The power supply 12 includes voltage sources 70, 72, 74, representing the three phase AC power supplied by the power supply 12. Inductors 76, 78, 80 (represented by $L_S$) represent the source inductance of the power supply 12. Inductors 24, 26, 28 represent the variable inductance of the power system, $L_1$.

The rectifier 14 operates in a PWM mode to convert the alternating current (AC) provided by the power supply 12 to direct current (DC) across the buses 15, 17. The controller 62 controls the upper and lower transistors to selectively couple the voltage sources 70, 72, 74 across the boost inductors 36, 38, 40 in accordance with the PWM technique. The transistors 42, 48 define a first pair associated with the "A" phase supplied by voltage source 70, the transistors 44, 50 define a second pair associated with the "B" phase supplied by voltage source 72, and the transistors 46, 52 define a third pair associated with the "C" phase supplied by voltage source 74. The LCL filter 22 mitigates ripple current present in the boost inductors 36, 38, 40 by regulating high frequency distortion of the AC supply voltages 70, 72, 74 and currents.

Still referring to FIG. 2, The dynamic equations for the PWM rectifier 14 in the synchronous reference frame, with the q-axis aligned with the AC input voltage are as follows, where $L_{eff}$ is the effective inductance including the unknown line inductance ($L_1$), filter 22 inductance and boost inductance ($L_b$), and $d_q^e$, $d_d^e$ are the PWM-averaged duty cycles of the rectifier switches.

$$L_{eff}\frac{di_q^e}{dt} = e_q^e - R_s i_q^e - \omega_e L_{eff} i_d^e - v_q^e \quad (1)$$

$$L_{eff}\frac{di_d^e}{dt} = -R_s i_d^e + \omega_e L_{eff} i_q^e - v_d^e$$

$$C\frac{dv_{dc}}{dt} = \frac{3}{2}(d_q^e i_q^e + d_d^e i_d^e) - i_L$$

$$v_q^e = d_q^e v_{dc}, v_d^e = d_d^e v_{dc}$$

Figure 3:
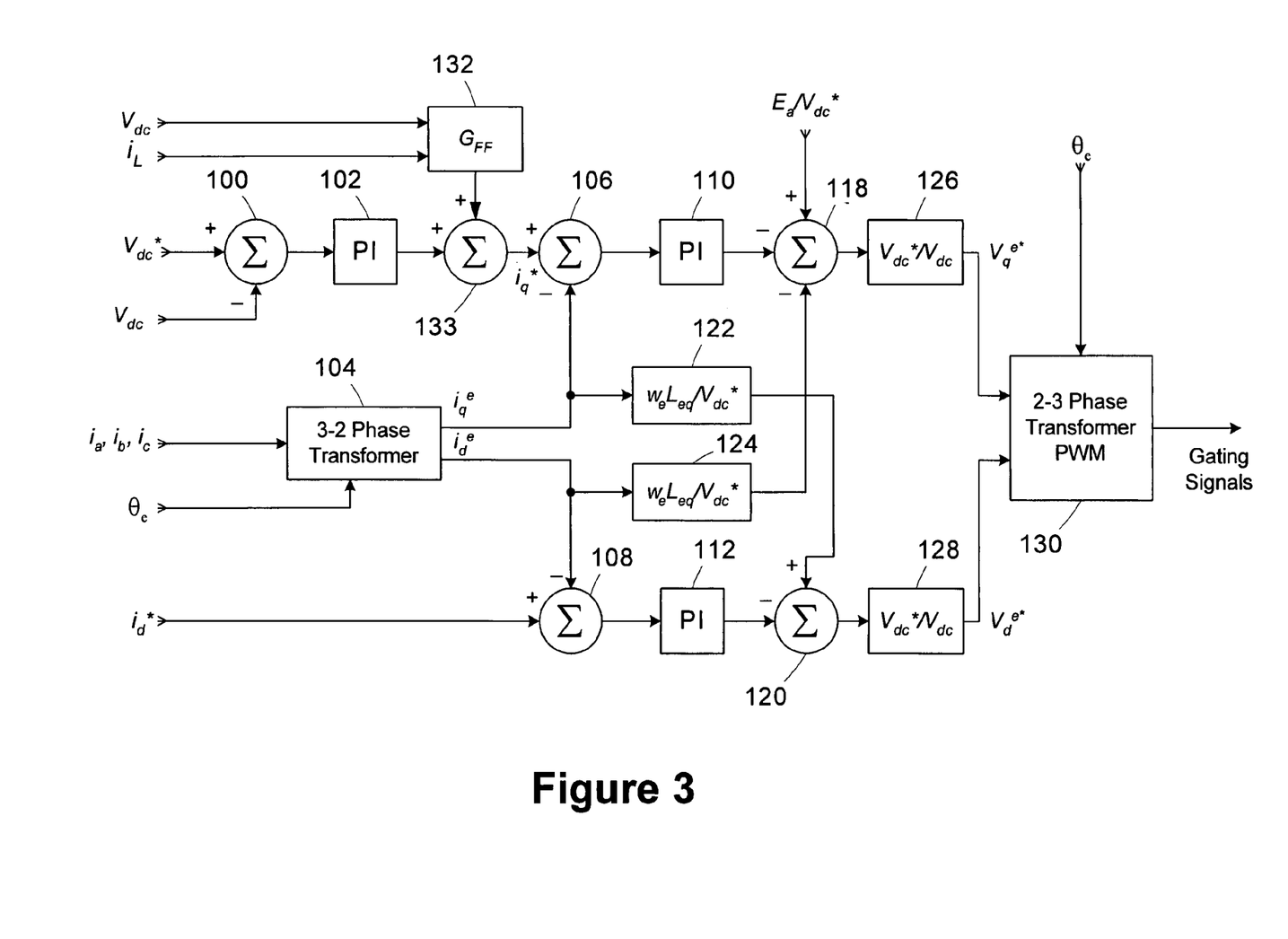
FIG. 3 is a diagram illustrating a closed-loop voltage-oriented control (VOC) scheme for a prior-art rectifier.

Turning to FIG. 3, a diagram illustrating a prior art closed-loop voltage-oriented control (VOC) scheme for rectifier is shown. The input voltages are measured at the point of common coupling (PCC) to synchronize the operation of the rectifier with the AC line. The control circuit includes an outer DC bus voltage regulating loop and two inner current loops—one for the q-axis (active) component of current and the other for the d-axis (reactive) component of current. The DC bus voltage regulating loop generates the q-axis current reference, $i_q^*$, using a summer 100 operable to subtract the command voltage for the rectifier, $V_{dc}^*$, from the voltage, $V_{dc}$, measured across the bus capacitor 60, and a proportional-integral (PI) controller 102.

A 3-2 phase transformer 104 receives feedback current measurements, $i_a$, $i_b$, $i_c$, measured through the boost inductors 36, 38, 40 and a flux angle, $\theta_e$, to transform the three phase currents to q and d feedback currents, $i_q^e$, $i_d^e$. Each inner current loop includes summers 106,108 for subtracting the feedback currents, $i_q^e$, $i_d^e$, from the current reference values, currents, $i_q^*$, $i_d^*$, respectively, to generate error signals which are provided to PI controllers 110,112. The outputs of controllers 110,112 are provided to summers 118, 120, respectively. Each feedback current, $i_q^e$, $i_d^e$, is multiplied by a gain factor, $w_e L_{eq}/V_{dc}^*$, in multipliers 122, 124 and provided as cross coupled input terms to the summers 120,118 for the opposing current loop. The peak value of the phase voltage $E_a$ (see FIG. 2) is normalized by the command voltage, $V_{dc}^*$, and provided to the summer 118 as a feed-forward term in the q-axis current loop.

The outputs of the summers 118,120 are multiplied by a gain factor, $V_{dc}^*/V_{dc}$, in multipliers 126, 128 to generate q and d voltage command signals, $V_q^{e*}$, $V_d^{e*}$, respectively. The voltage command signals are provided to a 2-3 phase transformer 130 to generate the gating signals used to control the rectifier switches. Algorithms for determining the electrical flux angle and implementing the converting operations performed by the transformers 104, 130 are well known in the art and as such, are not described in greater detail herein.

To obtain unity power factor at the input, the d-axis current reference, $i_d^*$, is set to zero. The current loop is designed to have high bandwidth, typically around ⅕$^{th}$ of the PWM switching frequency. The bandwidth ($BW_I$) and damping ($\delta_I$) of the current loop are related to the gains of the current loop PI controllers 110, 112 ($K_P$, $K_I$) as follows:

$$BW_I = \frac{V_{dc}}{L_{eff}}K_I \quad (2)$$

$$\delta_I = \frac{\sqrt{\frac{V_{dc}}{L_{eff}}K_I}}{2\sqrt{K_P}}$$

The PI controller 110, 112 gains are directly proportional to $L_{eff}$. Since the (variable) inductance $L_1$ is usually not known, the gains are set assuming either a fixed value of $L_1$ or ignoring it in comparison to the filter and boost inductances ($L_{eq}$ is the equivalent inductance of the filter and boost inductance $L_b$). In applications where the value of $L_1$ is significant, the performance of the controller degrades. If the effective inductance $L_{eff}$ is much larger than $L_{eq}$, then the bandwidth and damping of the current loop decrease, resulting in slower dynamics and oscillatory current response.

In the control method shown in FIG. 2, the steady state q- and d-axes commanded voltages are $$v_q^{e*} = E_a - R_s i_q^e - \omega_e L_{eff} i_d^e$$

$$v_d^{e*} = \omega_e L_{eff} i_q^e - R_s i_d^e \quad (3)$$

Typically, the d-axis current command is set to zero to obtain unity power factor at the input. Then, if the line inductance ($L_1$) is known, i.e. $L_{eq} = L_{eff}$, the output of the d-axis PI controller 112 is zero in steady state. However, if $L_1$ is not known, the PI controller 112 output ramps up to the value needed to force the d-axis current error to zero. In either case, the d-axis voltage command ($v_d^{e*}$) is equal to $\omega_e L_{eff} i_q^e$. In certain applications, a d-axis current, $i_d^*$, is also commanded to improve the voltage margin of the converter for current commutation.

A feed forward gain unit 132 is provided for generating a feed forward gain $G_{FF}$ based on the DC voltage, $V_{DC}$, and the load current, $I_L$ in accordance with known techniques. An adder 133 is provided for adding the feed forward gain into to the forward path of the DC bus voltage regulating loop. For better dynamic performance and faster response to sudden load transients, load power feed-forward may be used to generate the q-axis current reference, with the PI controller 110 generating only a small portion of the current reference to account for losses in the system.

The controller 62 of the present invention differs from that described above in reference to FIG. 3, in that it estimates the effective inductance on-line and adjusts the current loop gains to obtain the desired dynamic response even under changing line conditions. Estimation of line inductance to adjust control gains is also important to avoid interactions and unstable operation in applications where parallel operation of three-phase rectifiers is required.

Figure 4:
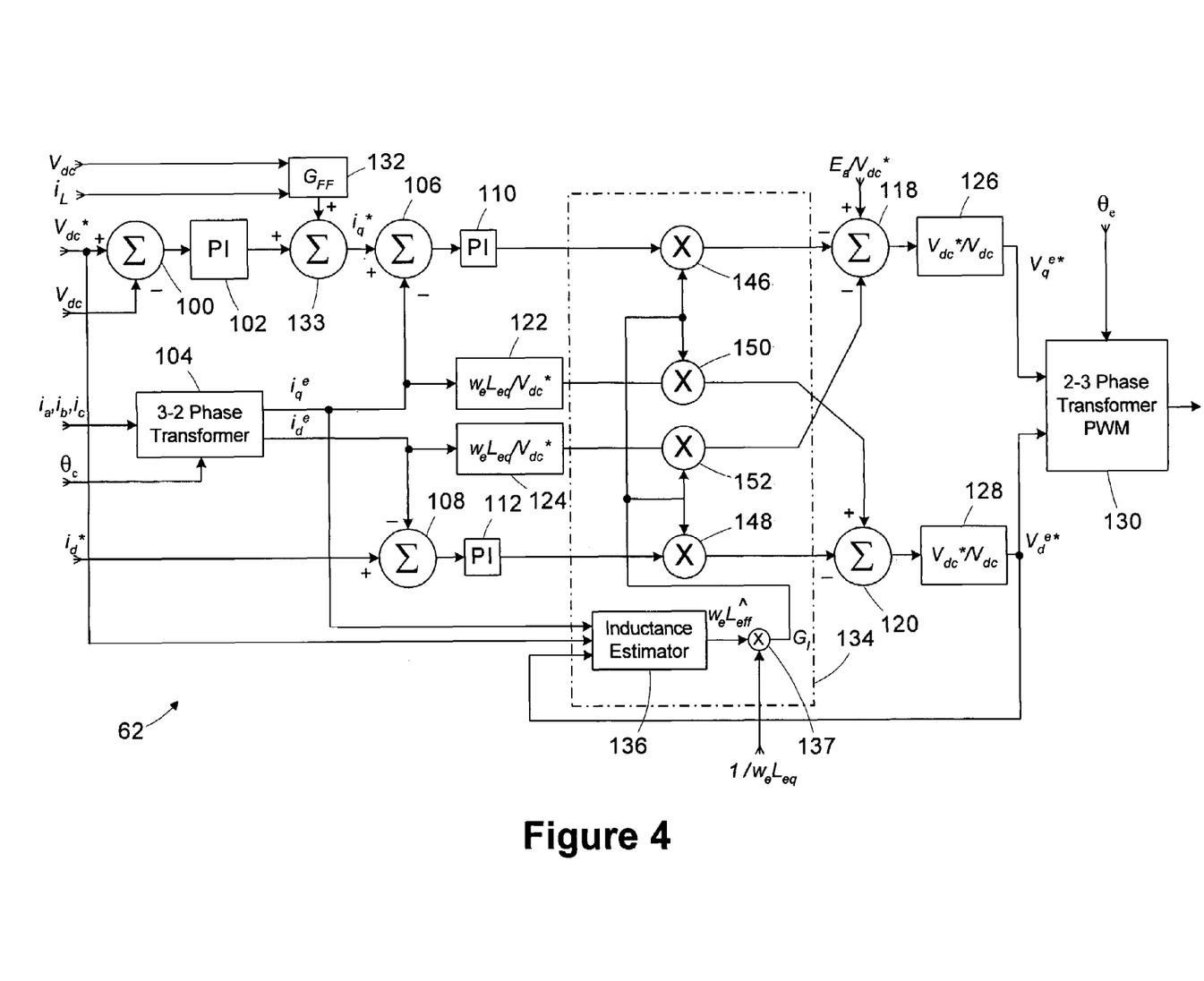
FIG. 4 is a diagram illustrating a closed-loop VOC scheme for the rectifier of the present invention implementing dynamic line inductance estimation and forward gain control.

As seen in FIG. 4, the controller 62 includes an inductance compensator 134 for generating an inductance gain, $G_L$, based on the estimated effective inductance. The inductance compensator 134 includes and inductance estimator 136 and multiplier 137. A simplified block diagram of the inductance estimator 136 is provided in FIG. 5.

Figure 5:
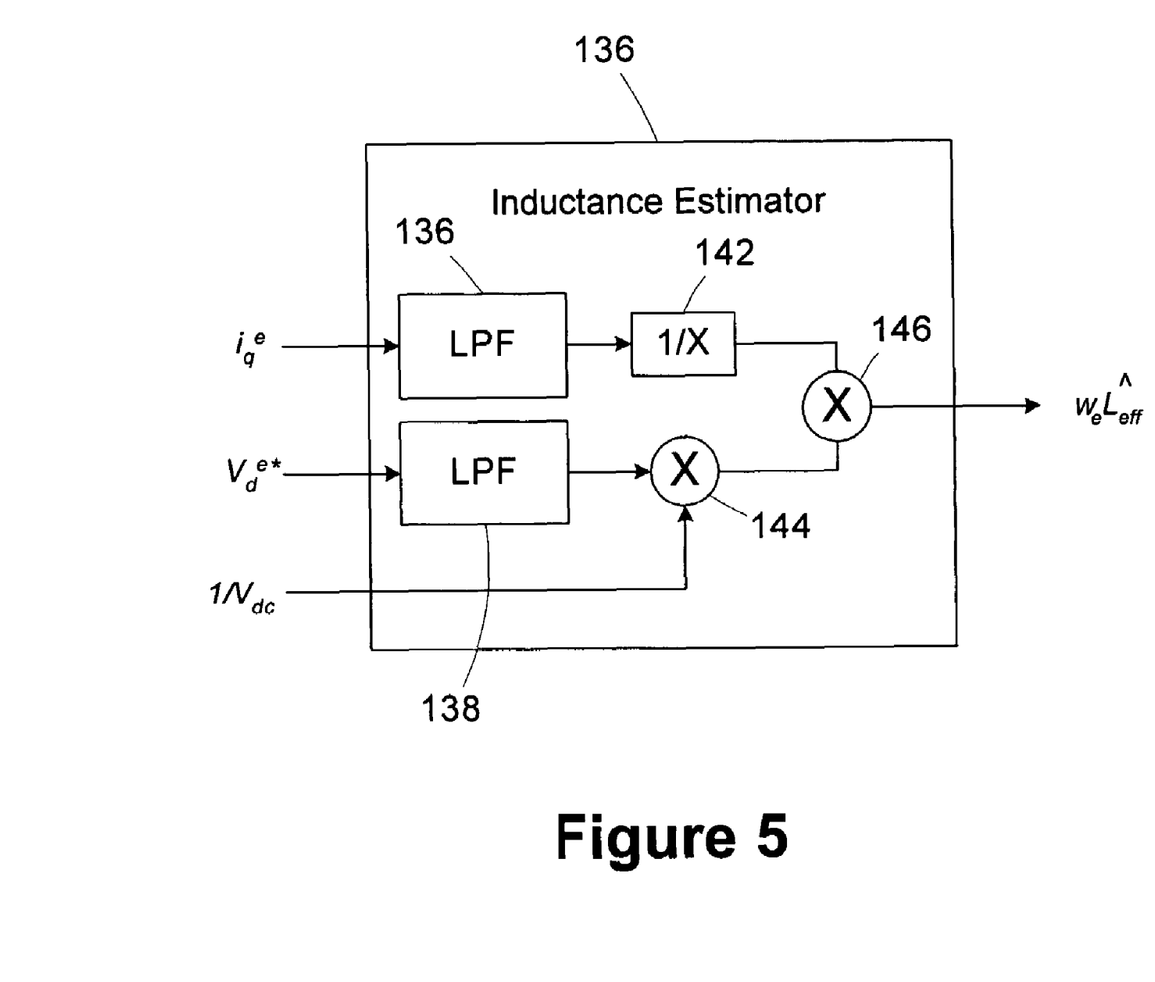
FIG. 5 is a diagram an inductance estimator in the rectifier of FIG. 4.

As seen in FIG. 5, the inductance estimator 136 includes low pass filters 138, 140 for filtering the q-axis feedback current, $i_q^e$, and the d-axis command voltage, $V_d^{e*}$, respectively. An inverter 142 is providing for determining the inverse of the filtered q-axis feedback current, and a multiplier 144 is provided for normalizing the filtered d-axis command voltage by the DC bus voltage, $V_{dc}$. Another multiplier 146 is provided for multiplying the outputs of the inverter 142 and the multiplier 144.

The commanded d-axis voltage, $V_d^{e*}$, and the measured q-axis current, $i_q^e$, are filtered and the ratio of the two quantities provides an estimate of the line reactance, $w_e \hat{L}_{eff}$.

$$\frac{V_d^{e*}(filtered)}{i_q^e(filtered)} = \frac{\omega_e L_{eff} i_q^e}{i_q^e} = \omega_e \hat{L}_{eff} \quad (4)$$

Since only the steady state values of the q-axis current and d-axis voltage command are required, the cut-off frequency of the filters 138, 140 may be very small. Hence, the estimate provided by the inductance estimator 136 is immune to unbalance or distortion in the line voltages and currents.

Returning to FIG. 4, the output of the inductance estimator 136, $w_e \hat{L}_{eff}$, is scaled by the factor, $1/w_e L_{eq}$, in the multiplier 137 to generate the inductance compensation gain factor, $G_I$.

$$G_I = \frac{\omega_e \hat{L}_{eff}}{\omega_e L_{eq}} = \frac{\hat{L}_{eff}}{L_{eq}} \quad (5)$$

The estimated line reactance ($\hat{L}_{eff}$) is then used to modify the gains of the PI controllers 110, 112 using the inductance compensation gain factor, $G_I$, in multipliers 146, 148. Hence, the PI controller gains for the q- and d- axes current loops are scaled by the ratio of the estimated to equivalent line inductance. The cross coupling terms of both axes generated by multipliers 122, 124 (i.e., $w_e L_{eq} i_q^e / V_{dc}^*$ and $w_e L_{eq} i_d^e / V_{dc}^*$) are also scaled by the inductance compensation gain factor in multipliers 150, 152.

The scaling of the q- and d- axes current loops and the cross coupled terms ensures that the bandwidth and damping of the current loop provided above in Equation (2) are equal to the desired values even for changing line impedance.

For applications where the line reactance is high and the line resistance is not negligible compared to the reactance, the d-axis current command can be set to zero for a brief interval to estimate the line inductance more accurately. The estimation algorithm employed by the controller 62 in implementing the inductance compensator 134 is simple and uses signals that are already available to the controller 62. Additional circuitry and/or complexity are not required. The gains of the PI controllers 110, 112 implementing the current loops may be adjusted with the estimated value of inductance to obtain desired controller performance even under changing line conditions. The method is also immune to unbalance and distortion in the line voltages. Estimation of line inductance to adjust control gains is also important to avoid interactions and unstable operation in applications where parallel operation of three-phase rectifiers is required.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A rectifier, comprising:
    a switching circuit coupled between positive and negative buses and a plurality of input voltage sources, the switching circuit including a plurality of pairs of switching devices, each pair being associated with one of the input voltage sources; and
    a controller including first and second control loops operable to generate control signals for operating the pairs of switching devices to generate a potential across the positive and negative buses, wherein the controller is further operable to estimate a line inductance seen by the rectifier based on at least one of the control signals and generate an inductance compensation gain factor for applying to the control loops based on the estimated line inductance.

2. The rectifier of claim 1, wherein the first control loop comprises a q-axis control loop operable to receive a q-axis command current and a q-axis feedback current and generate a q-axis command voltage, and the second control loop comprises a d-axis control loop operable to receive a d-axis command current and a d-axis feedback current and generate a d-axis command voltage.

3. The rectifier of claim 2, wherein the controller further comprises a third control loop operable to receive a DC command voltage and a DC feedback voltage and generate the q-axis command current based on a difference between the DC command voltage and the DC feedback voltage.

4. The rectifier of claim 2, wherein the controller is operable to estimate the line inductance based on the d-axis command voltage.

5. The rectifier of claim 4, wherein the controller is operable to estimate the line inductance based on the d-axis command voltage and the q-axis feedback current.

6. The rectifier of claim 5, wherein the controller further comprises an inductance estimator operable to receive the d-axis command voltage and the q-axis feedback current and divide the d-axis command voltage by the q-axis feedback current to generate the line inductance estimate.

7. The rectifier of claim 6, wherein the inductance estimator is operable to filter the d-axis command voltage and the q-axis feedback current.

8. The rectifier of claim 6, further comprising:
    a filter operable to being coupled to the input voltage sources; and
    a plurality of boost inductors coupled between the filter and the switching circuit, wherein the inductance estimator is operable to divide the estimated inductance by an equivalent inductance of the filter and boost inductors to generate the inductance compensation gain factor.

9. The rectifier of claim 2, wherein the controller is operable to generate a d-axis command current of zero.

10. The rectifier of claim 2, wherein the controller is operable to generate a d-axis command current of zero for a predetermined time interval and estimate the line inductance based on the d-axis command voltage during the predetermined time interval.

11. A rectifier operable to deliver a load current to an associated load, comprising:
- a switching circuit coupled between positive and negative buses and a plurality of input voltage sources, the switching circuit including a plurality of pairs of switching devices, each pair being associated with one of the input voltage sources, wherein the positive and negative buses are operable to being coupled to the load; and
- a controller, comprising:
- a first control loop operable to generate a first control signal for operating the pairs of switching devices to control a real component of the load current;
- a second control loop operable to generate a second control signal for operating the pairs of switching devices to control a reactive component of the load current; and
- an inductance compensation unit operable to estimate a line inductance seen by the rectifier based on at least the second control signal and generate an inductance compensation gain factor for applying to the first and second control loops based on the estimated line inductance.

12. The rectifier of claim 11, wherein the first control loop is operable to receive a first command current and a first feedback current and generate the first control signal based on a difference between the first command current and the first feedback current, and the second control loop is operable to receive a second command current and a second feedback current and generate the second control signal based on a difference between the second command current and the second feedback current.

13. The rectifier of claim 12, wherein the controller further comprises a third control loop operable to receive a rectifier command voltage and a rectifier feedback voltage and generate the first command current based on a difference between the rectifier command voltage and the rectifier feedback voltage.

14. The rectifier of claim 12, wherein the controller is operable to estimate the line inductance based on the second control signal and the first feedback current.

15. The rectifier of claim 14, wherein the inductance compensation unit is operable to receive the second control signal and the first feedback current and divide the second control signal by the first feedback current to generate the line inductance estimate.

16. The rectifier of claim 15, wherein the inductance compensation unit is operable to filter the second control signal and the first feedback current.

17. The rectifier of claim 15, further comprising:
- a filter operable to being coupled to the input voltage sources; and
- a plurality of boost inductors coupled between the filter and the switching circuit, wherein the inductance estimator is operable to divide the estimated inductance by an equivalent inductance of the filter and boost inductors to generate the inductance compensation gain factor.

18. The rectifier of claim 12, wherein the controller is operable to generate a second command current of zero.

19. The rectifier of claim 12, wherein the controller is operable to generate a second command current of zero for a predetermined time interval and estimate the line inductance based on the second control signal during the predetermined time interval.

20. A method for controlling a rectifier including a switching circuit coupled between positive and negative buses and a plurality of input voltage sources, the switching circuit including a plurality of pairs of switching devices, each pair being associated with one of the input voltage sources, the method comprising:
- generating control signals for operating the pairs of switching devices to generate a potential across the positive and negative buses;
- estimating a line inductance seen by the rectifier based on at least one of the control signals;
- generating an inductance compensation gain factor for use in generating the control signals based on the estimated line inductance.

21. The method of claim 20, wherein generating the control signals further comprises:
- receiving a first command current and a first feedback current associated with a first control axis;
- generating a first control signal based on a difference between the first command current and the first feedback current;
- receiving a second command current and a second feedback current associated with a second control axis; and
- generating a second control signal based on a difference between the second command current and the second feedback current, wherein estimating the line inductance further comprises estimating the line inductance based on the second control signal.

22. The method of claim 21, further comprising:
- receiving a rectifier command voltage and a rectifier feedback voltage; and generating the first command current based on a difference between the rectifier command voltage and the rectifier feedback voltage.

23. The method of claim 21, wherein estimating the line inductance further comprises estimating the line inductance based on the second control signal and the first feedback current.

24. The method of claim 23, wherein estimating the line inductance further comprises dividing the second control signal by the first feedback current.

25. The method of claim 24, further comprising filtering the second control signal and the first feedback current.

26. The method of claim 24, wherein the rectifier includes a filter operable to being coupled to the input voltage sources and a plurality of boost inductors coupled between the filter and the switching circuit, and generating the inductance compensation gain factor further comprises dividing the estimated inductance by an equivalent inductance of the filter and boost inductors.

27. The method of claim 21, further comprising generating a second command current of zero.

28. The method of claim 21, further comprising:
- generating a second command current of zero for a predetermined time interval; and
- estimating the line inductance based on the second control signal during the predetermined time interval.

* * * * *